Patented Oct. 10, 1939

2,175,491

UNITED STATES PATENT OFFICE 2,175,491

WATER-INSOLUBLE SOAP AND METHOD OF MAKING THE SAME

Frederick A. Stresen-Reuter and Charles Rimpila, Chicago, Ill., assignors to Fred'k A. Stresen-Reuter, Inc., a corporation of Illinois No Drawing. Application February 26, 1938, Serial No. 192,884

13 Claims. (Cl. 87—16)

This invention relates to soap and soap manufacture and more particularly to water-insoluble metal and alkaline earth metal soaps and to methods of making the same.

In accordance with our invention we have found that novel water-insoluble soaps such as the heavy metal soaps and the alkaline earth metal soaps can be formed from an organic acid-containing liquor obtained from wood as a by-product in the manufacture of paper, such as that sold in the trade under the trade-mark "Spefa". This liquor is characterized by the presence of a major proportion by weight of unsaturated fatty acids calculated as oleic, linoleic and linolenic, a minor proportion by weight of rosin acids or acids calculated as rosin acids and a relatively small proportion of unsaponifiables, (mainly sterols). A suitable liquor called "Spefa" employed in accordance with our invention has a specific gravity (at 15.5° C.) of about 969; an acid number of about 164.0; a saponification number of about 173.0; an ester number of about 9.4; an iodine number (Wijs) of about 148.0; and a thiocyanogen-iodine number of about 91.0, and is a refined mixture of fatty acids, rosin acids and sterols derived from the liquor from the sulfate-process treatment of woods such as pine.

A typical analysis of this liquor is as follows. In the following analysis and in all examples hereinafter set forth, the term "parts" indicates parts by weight.

| | Parts (approx.) |
|---|---|
| Fatty acid calculated as linolenic acid | 19.25 |
| Fatty acid calculated as linoleic acid | 10.50 |
| Fatty acid calculated as oleic acid | 23.04 |
| Rosin acids (or acids calculated as rosin acids) | 39.20 |
| Unsaponifiables, largely sterols | 8.01 |

In preparing metal or alkaline earth metal soaps from the liquor used in accordance with our invention, the liquor may be first boiled in a suitable vessel with any suitable alkaline solution such as, for example, with aqueous caustic soda or potash, or with an organic amine compound such as triethanolamine, to form a water-soluble soap solution. The soap solution so formed may then be diluted, suitably to about 20% solids in the case of sodium or potassium soaps, and to about 10% solids in the case of the triethanolamine soap and the solution maintained at about 200° F. while the required amount of the metal or alkaline earth metal compound is added. The metal or alkaline earth metal soap is then formed by double decomposition and precipitates to the bottom of the vessel. The precipitated water-insoluble soap is then separated in any desirable manner, washed with boiling water and then slowly heated to about 350° F. to remove substantially all of the water therefrom.

The metal or alkaline earth metal soaps embodying our invention may also be prepared by directly fusing the liquor with compounds of the desired metal or alkaline earth metal such as the oxides or hydroxides of the desired metals. Thus, in accordance with our invention, the liquor may be heated to about 350° to 400° F. and the oxide or hydrate of the desired metal slowly added. The mixture is held at about 400° F. or higher until the reaction is complete, as indicated by the formation of a clear pill when a small amount of the reaction product is dropped onto a glass slide.

In general, equivalent or stoichiometrical or other desirable amounts of the reactants are employed to produce the water-insoluble metal and alkaline earth metal soaps embodying our invention. In carrying out the processes embodying our invention we have produced, for example, the water-insoluble cobalt, manganese, iron, copper, lead, zinc, chromium, aluminum, vanadium and like metal soaps, and, for example, the calcium, barium, magnesium and like alkaline earth metal soaps.

The following examples illustrate the methods employed in accordance with our invention to produce our novel water-insoluble metal and alkaline earth metal soaps. It is, of course, to be understood that the water-insoluble soaps produced in accordance with the following examples are merely illustrative of the soaps embodying our invention since our invention comprehends the class of the water-insoluble metal and alkaline earth metal soaps of the acids set forth above.

DOUBLE DECOMPOSITION METHODS

Example 1

Part I 100 parts of the liquor "Spefa" are mixed with 100 parts of water and 12.38 parts of sodium hydroxide in a suitable vessel. The mixture is boiled until the resulting water-soluble soap solution has a pH of about 8 to 9; the time of reaction being about three hours. The soap solution so formed is now diluted, suitably to about 20% solids content.

Part II

The water-soluble soap solution produced in accordance with Part I is then mixed with 24.4 parts of cobalt sulphate in aqueous solution (about 20% solids) at about 200° F. The water-insoluble cobalt soap is formed by double decomposition and precipitates to the bottom of the vessel. The precipitated cobalt soap is washed several times with boiling water as by stirring and decanting to remove any impurities therefrom and is then slowly heated to about 350° F. to form a dehydrated water-insoluble cobalt soap.

Example 2

A water-soluble soap is formed as in Part I of Example 1 and is treated with about 19.78 parts of manganese chloride in aqueous solution (about 20% solids) to form the water-insoluble manganese soap. The soap is then washed and dried all as fully described in Part II of Example 1.

Example 3

A water-soluble soap is formed as described in Part I of Example 1 and to this soap is added 17.41 parts of calcium chloride in aqueous solution (about 20% solids) to form the water-insoluble calcium soap, all as fully described in Part II of Example 1. The resulting calcium soap is removed from the bottom of the vessel, washed with warm water and then air-dried.

Example 4

The water-insoluble barium soap is formed in the same manner as the water-insoluble calcium soap described in Example 3 except that about 32.8 parts of barium chloride in aqueous solution (about 20% solids) is used to precipitate a water-insoluble barium soap.

FUSION METHODS

Example 5

100 parts of the liquor "Spefa" are heated in a suitable vessel to about 350° to 400° F. and about 14.61 parts of cobalt hydroxide are then slowly added. The mixture is held at about 400° F. or higher until all of the cobalt hydrate has reacted with the liquor, as indicated by the formation of a clear pill on a glass slide.

Example 6

33.7 parts of lead oxide (litharge) are reacted with 100 parts of the "Spefa" liquor to form the lead soap as fully described in Example 5.

Example 7

19.95 parts of manganese hydrate are reacted with 100 parts of the "Spefa" liquor to form the manganese soap as fully described in Example 5.

Example 8

12.55 parts of zinc oxide are reacted with 100 parts of the "Spefa" liquor to form the zinc soap as fully described in Example 5.

Using the wood fatty acids, such as the liquor "Spefa" in acordance with our invention, it is possible to obtain almost the equivalent or stoichiometrical amount of metal in the soap by the fusion method. Thus in accordance with our invention it is possible to obtain a cobalt soap by the fusion method having a cobalt content in the order of about 8% and slightly higher. On the other hand, with a similar method using rosin acids or the fatty acids such as linseed fatty acids and the like in lieu of the "Spefa", only a small amount of metal can be incorporated in the soap, in the order of about 3 to 5%.

The water-insoluble metal and alkaline earth metal soaps embodying our invention are readily soluble in suitable vehicles or solvents such as, for example, the light petroleum distillates including heavy naphtha, kerosene, V. M. and P. naphtha, and the petroleum naphtha thinner sold in the trade under the trade-mark "Apco"; paraffin oils, and the like; or in raw or bodied vegetable drying or semi-drying oils such as, for example, linseed, perilla, China-wood oil, soy bean, oiticica, and the like; and in animal oils such as fish oils and the like. The solutions formed are homogeneous and stable, and the water-insoluble soap will not, in general, settle out from the vehicle even when the solution is cooled to below room temperature. The water-insoluble soaps embodying our invention will not oxidize when in solution.

In general, the water-insoluble soaps embodying our invention are relatively odorless and are excellent driers and may be used for that purpose in varnishes, paints, printing inks, and the like. Some of these water-insoluble soaps are especially adapted for use in oils to form greases and others have special utility as dispersing agents for pigments in the grinding of paints, inks, and the like.

Solutions of the cobalt soaps of the wood organic acid mixture such as "Spefa" in heavy naphtha have a desirable bluish-purple color which does not change on standing. The cobalt soaps are readily soluble in petroleum thinners and the solutions formed remain liquid even when the concentration of the soap in the solution is in the order of about 50% and higher. The cobalt soaps made from linseed oil and the like or rosin acids as in the prior art, when present in petroleum thinners in similar concentrations, form gels on standing. With concentrations of the cobalt soap in petroleum thinners in the order of about 75%, a heavy paste is formed. The zinc soaps produced in accordance with our invention have special utility in paints to prevent wrinkling of the coating. The iron and vanadium soaps are excellent driers and the former has special utility as a drier in baking blacks, varnishes and enamels. The copper soaps have fungicidal properties, and being readily soluble in petroleum thinners, are especially suitable for use in paints for coating ship bottoms. The manganese soaps embodying our invention are readily soluble in petroleum thinners and form liquids even when the concentration of manganese soap in the solution is in the order of about 50% and slightly higher. The manganese soaps made from linseed oil and the like or rosin acids as in the prior art, when present in petroleum thinners in similar concentrations, form gels on standing. The manganese soaps appear to impart better drying characteristics to paints, varnishes, inks and the like than are capable of being obtained by any of the known water-insoluble soaps containing an equivalent amount of metal. The calcium, barium and magnesium soaps embodying our invention are readily soluble in petroleum thinners, paraffin oils, and the like and with concentrations of about 10 to about 50% and higher in the solution, these soaps serve to body the oils to meet any desired needs in oil lubricants and greases. With about 20 parts of the calcium soap dissolved in about 80 parts of heavy naphtha or paraffin oil (100/100 viscosity), the solutions formed are gels at room temperature which are admirably suitable for use as greases. With about 20 to 50 parts of the barium soap in 50 to 80 parts of the same solvents, the solutions are similarly gels in character. The alkaline earth metal soaps, in relatively small amounts, appear to possess wetting and dispersing characteristics in paints and varnishes and, in consequence, increase the spread and flow thereof.

In accordance with our invention we have also produced excellent water-insoluble soaps by reacting metal compounds with the liquor "Spefa" which has been freed from all unsaponifiable materials as, for example, by washing the water-soluble soap of "Spefa" with petroleum ether. We have prepared also excellent water-insoluble soaps by the aid of synthetic preparations of acids, either with or without saponifiables such as sterol or sterol compounds, which closely approximate the acids, in character and in amount, present in the liquor "Spefa". Thus, we have obtained satisfactory soaps by reacting, in the manner described above, metal compounds with a mixture of acids, the major proportion of which is unsaturated fatty acids and the minor proportion of which is rosin or rosin acids and the like. The synthetic acid mixture used in accordance with our invention may, if desired, contain a small proportion of sterol and/or sterol compounds or like unsaponifiable materials.

Wood organic acid mixtures similar to "Spefa" such as "Indusoil", "Liqro" may be used in lieu of the "Spefa" in accordance with our invention.

We claim:

1. A water-insoluble soap comprising the reaction product of a metal compound and a mixture comprising a major proportion of unsaturated fatty acids, a minor proportion of rosin acids and a small proportion of a sterol.

2. As a new reaction product, a water-insoluble cobalt soap of a product derived from pine wood comprising a major proportion of unsaturated fatty acids, a minor proportion of rosin acids and a small proportion of an unsaponifiable material calculated as a sterol.

3. As a new reaction product, a water-insoluble manganese soap of a product derived from pine wood comprising a major proportion of unsaturated fatty acids, a minor proportion of rosin acids and a small proportion of an unsaponifiable material calculated as a sterol.

4. As a new reaction product, a water-insoluble lead soap of a product derived from pine wood comprising a major proportion of unsaturated fatty acids, a minor proportion of rosin acids and a small proportion of an unsaponifiable material calculated as a sterol.

5. The method of forming a water-insoluble soap comprising reacting a product derived from pine wood comprising a major proportion of unsaturated fatty acids, a minor proportion of rosin acids and a small proportion of an unsaponifiable material calculated as a sterol with a metal compound at a relatively high temperature.

6. The method of forming a water-insoluble soap comprising reacting a product derived from pine wood comprising a major proportion of unsaturated fatty acids, a minor proportion of rosin acids and a small proportion of an unsaponifiable material calculated as a sterol with a metal compound at a temperature in the order of about 350° to 400° F.

7. The method of forming a water-insoluble soap comprising reacting a product derived from pine wood comprising a major proportion of unsaturated fatty acids, a minor proportion of rosin acids and a small proportion of an unsaponifiable material calculated as a sterol with a metal hydroxide at a relatively high temperature.

8. The method of forming a water-insoluble soap comprising reacting a product derived from pine wood comprising a major proportion of unsaturated fatty acids, a minor proportion of rosin acids and a small proportion of an unsaponifiable material calculated as a sterol with cobalt hydrate at a relatively high temperature.

9. The method of forming a water-insoluble soap comprising reacting a product derived from pine wood comprising a major proportion of unsaturated fatty acids, a minor proportion of rosin acids and a small proportion of an unsaponifiable material calculated as a sterol with manganese hydrate at a relatively high temperature.

10. The method of forming a water-insoluble soap comprising reacting a product derived from pine wood comprising a major proportion of unsaturated fatty acids, a minor proportion of rosin acids and a small proportion of an unsaponifiable material calculated as a sterol with lead hydrate at a relatively high temperature.

11. A water-insoluble soap comprising the reaction product of a metal compound and a mixture comprising a major proportion of unsaturated fatty acids, a minor proportion of rosin acids and a small proportion of an unsaponifiable material calculated as a sterol.

12. A water-insoluble soap comprising the reaction product of a metal compound and an organic acid mixture derived from wood comprising a major proportion of unsaturated fatty acids, a minor proportion of rosin acids and a small proportion of non-saponifiable material calculated as a sterol.

13. A water-insoluble soap comprising the reaction product of a metal compound and an organic acid mixture derived from pine wood comprising a major proportion of unsaturated fatty acids, a minor proportion of rosin acids and a small proportion of sterols.

FREDERICK A. STRESEN-REUTER.
CHARLES RIMPILA.